June 2, 1942.   H. L. BEEKLEY ET AL   2,285,323
AUTOMATIC VALVE
Filed Jan. 19, 1940   3 Sheets-Sheet 3

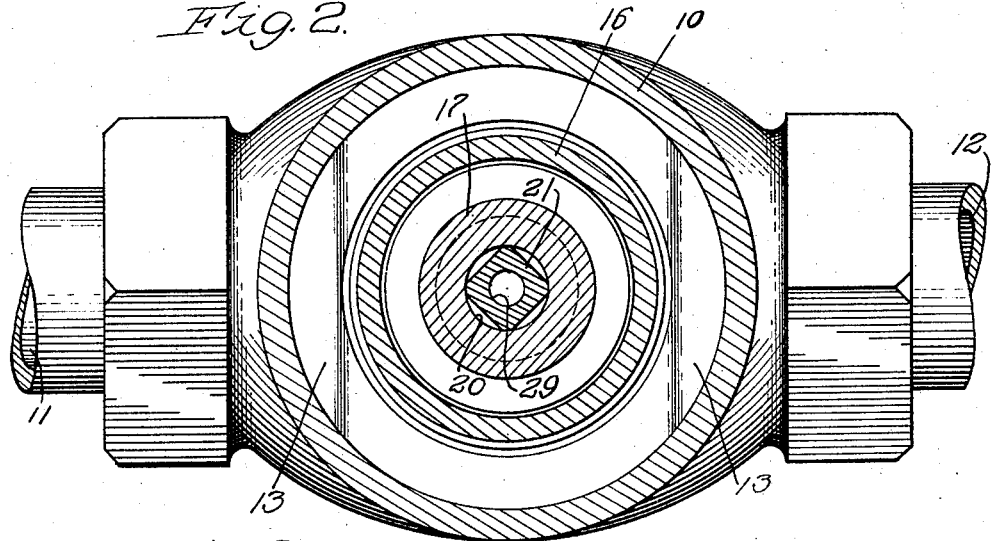
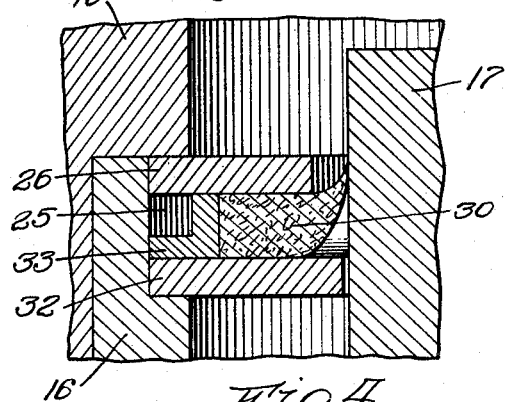
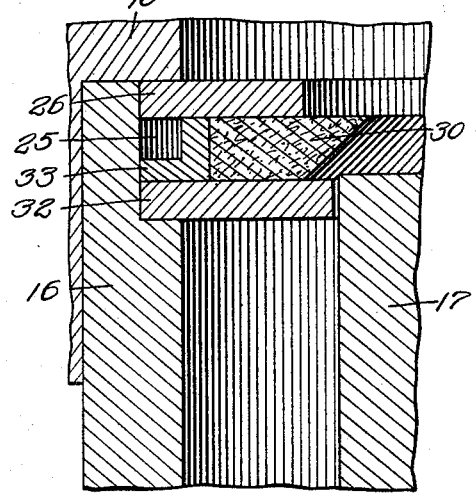
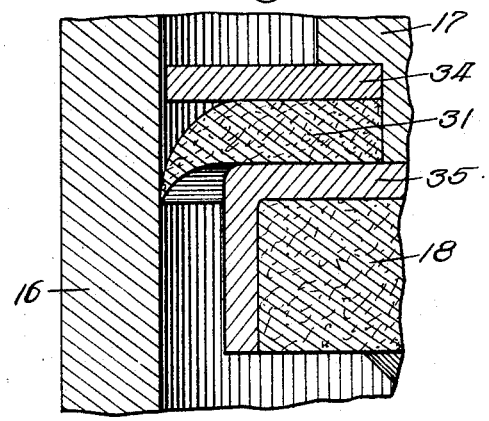

Inventors:
Henry L. Beekley,
Richard H. Gilbert,
Rollin H. Lacart,
By Christen, Wiles, Davies, Hirsch & Dawson,
Attys.

Patented June 2, 1942

2,285,323

UNITED STATES PATENT OFFICE 2,285,323

AUTOMATIC VALVE

Henry L. Beekley, Glen Ellyn, and Richard H. Gilbert and Rollin H. Lacart, Chicago, Ill., assignors to The Electrimatic Corporation, a corporation of Illinois Application January 19, 1940, Serial No. 314,730

3 Claims. (Cl. 137—139)

This invention relates to an automatic valve, and more particularly to an improved seal adapted to make rubbing engagement with a moving part of the valve.

Figure 1:
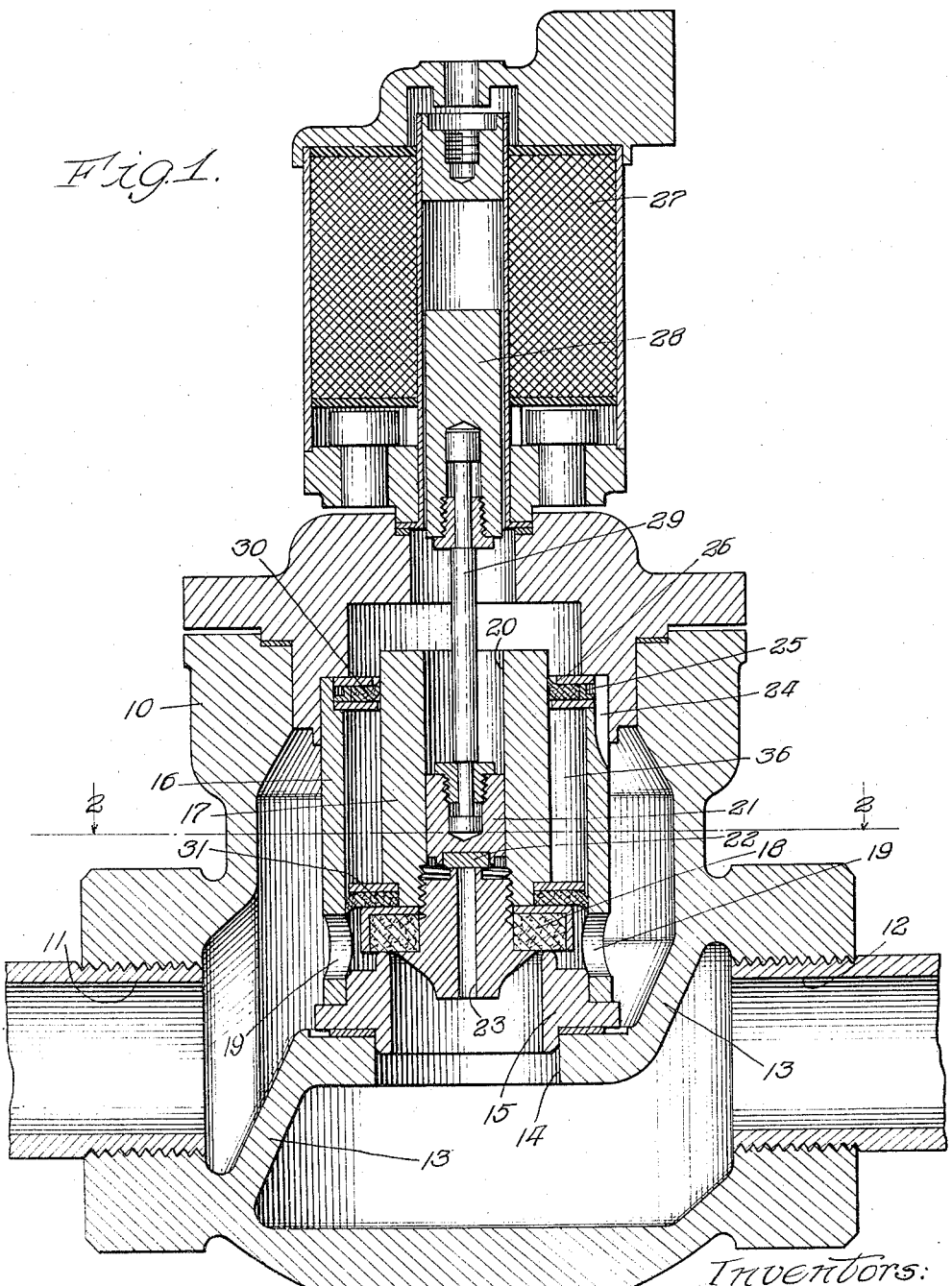
Figure 6:
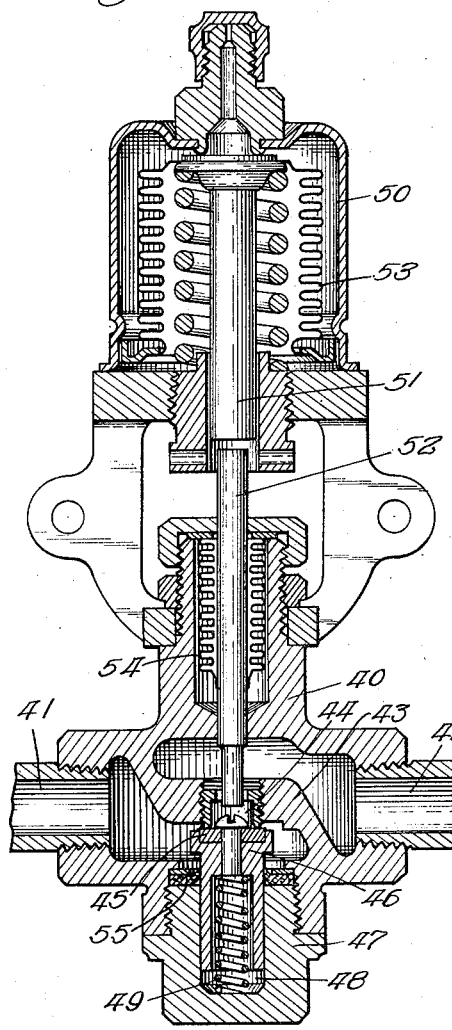
Figure 8:
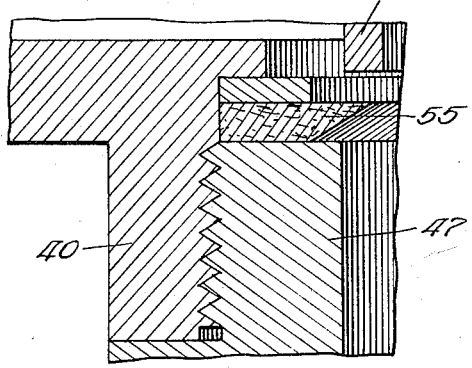
Figure 9:
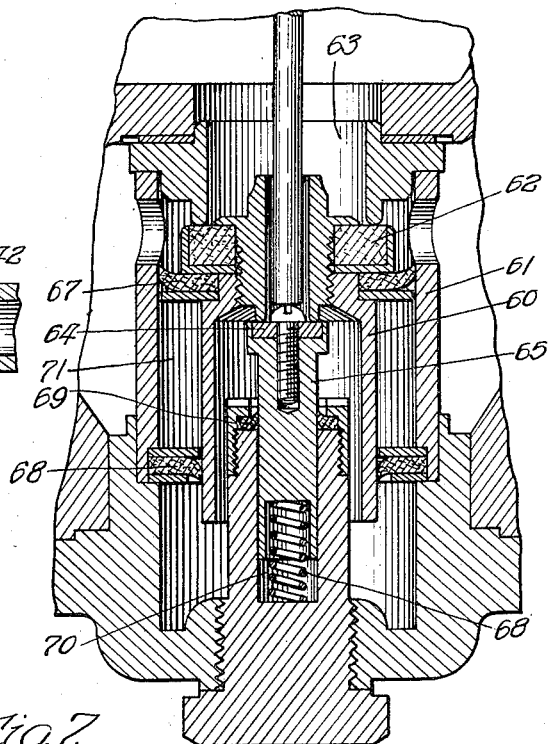
Figure 7:
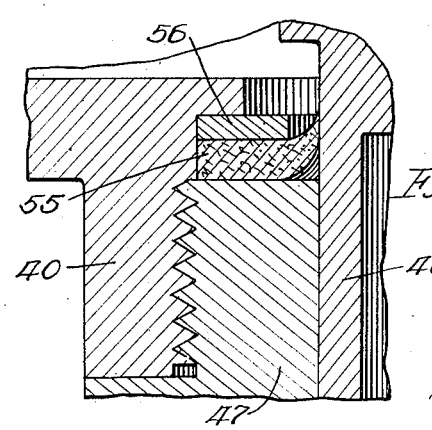

One feature of this invention is that it provides a greatly improved automatic valve; another feature of this invention is that it provides increased length of life and freedom from sticking of the moving parts; yet another feature is that the piston of such a valve is provided with an improved annular seal; a further feature of this invention is that it is so arranged that the valve member moves toward closed position at a relatively slow rate without having its opening movement restrained to any substantial degree; still another feature of this invention is that it provides a dash-pot action so arranged as to permit the valve to open readily, but to so restrain its closing movement as to prevent water hammer; and other features and advantages of this invention will be apparent from the following specification and the drawings, in which:

Figure 1 is a vertical sectional view of an electrically actuated automatic valve embodying the invention; Figure 2 is a horizontal sectional view along the line 2—2 of Figure 1; Figure 3 is a fragmentary detail sectional view of the upper sealing element; Figure 4 is a fragmentary detail sectional view of the lower sealing element; Figure 5 is a fragmentary detail sectional view of the upper sealing element before it has been distorted by engagement with the surface of the piston; Figure 6 is a vertical sectional view of another type of automatic valve embodying our invention; Figure 7 is a detail fragmentary sectional view of the sealing element of the valve shown in Figure 6; Figure 8 is a similar view showing the sealing element before it has been distorted by engagement with the piston; and Figure 9 is a partial vertical sectional view of another modification.

It is now quite common to use automatic valves, actuated from a remote point by electricity, fluid pressure, or some other transmission means, for controlling fluid flow in accordance with some variable conditions. Automatic valves of the character here disclosed are used, for example, to control the flow of cooling water in commercial refrigerating systems.

Valves of the type here disclosed include a casing having an inlet and outlet divided by a partition having an opening therethrough, a piston reciprocable in a cylinder in the casing carrying a valve member adapted to close the opening in one position of the piston, and some means for effecting movement of the piston and valve member. In the valves shown in Figures 1 and 9 a pilot valve is moved to effect movement of the main piston and valve member; whereas in the valve shown in Figure 6 the piston is moved directly by a mechanical pressure. The force of control power may be electrical, as shown in Figure 1, or fluid, as shown in Figure 6.

Heretofore the moving pistons of such valves have been made a fairly close fit in their cooperating cylinders, and considerable trouble has been experienced with sticking. This might be caused, for example, by corrosion of the metal by the fluid being handled; or by particles of rust, dirt, or the like in the fluid. The fluid being controlled is frequently at pressures exceeding one hundred pounds to the square inch, and considerable trouble has heretofore also been encountered with hammer upon closing movement of the valve member.

We have obviated these and other objections to automatic valves of the type herein disclosed by providing an improved sealing element which has long life; which provides such good sealing engagement that undesired particles of material cannot work by it; which permits much looser fits and wider clearances in the cooperating parts; and yet, in spite of its particularly effective seal, does not unduly restrain movement of the piston. Furthermore, we have so constructed and arranged the parts as to provide a dash-pot action improving considerable restraint upon closing movement of the valve without substantially restraining opening movement thereof.

In the particular embodiment of our invention illustrated in Figures 1 to 5 an automatic valve is shown having a main body portion or casing 10 having an inlet 11 and an outlet 12 separated by a partition 13 having a central opening 14 therethrough. A valve seat is provided by the upper rounded edge of the member 15; and a cylinder is provided, concentrically positioned therewith, by the brass tube 16. A piston 17 is movably mounted in the cylinder and carries at its lower end a valve member proper 18, of any appropriate gasket material, adapted to engage the valve seat about the opening 14. The brass tube has therethrough openings such as 19.

The piston 17 has a central longitudinal bore 20 therethrough providing a cylinder within which an auxiliary piston 21 is adapted to reciprocate. This piston carries a pilot valve member 22 adapted to close the flow channel 23 provided through the end of the piston 17. A flow path to the space above the main piston is provided for fluid from the inlet through the recess 24, the annular channel 25, and a slot (not here shown) in the upper metal ring 26.

Actuating means permitting control of the valve from a remote point is here shown in the form of a solenoid coil 27 adapted to effect movement of the solenoid member 28. This member 28 is connected to the pilot valve auxiliary piston 21 by linkage in the form of a rod 29 having lost motion connection at each end.

As long as the pilot valve member 22 closes the flow channel 23 the pressure of the fluid (greater on the inlet than on the outlet side of the valve) would hold the piston and main valve down in the position shown in the drawings, thus keeping the valve closed and preventing flow of fluid therethrough. Upon change of some variable provided as a control for the valve, as by closing of a thermostat in a cold room, current is supplied to the solenoid 27 to effect upward movement of the member 28. After a short movement this picks up the rod 29, which after slight further movement picks up the piston 21 and thus opens the pilot valve. Inasmuch as the flow channel 23 is designed to be larger than the minimum restriction in the path through the openings 24 and 25, the pressure behind the piston 17 decreases until the downward force on the piston is less than the upward force provided by the fluid around the lower end of the piston. The piston then moves upwardly, carrying the valve member 18 with it and opening the valve, so that fluid, as condenser cooling water, flows through it to the desired point. When conditions again change, as when the temperature in the cold room has dropped to the desired minimum, the current through the solenoid 27 is interrupted and the member 28 drops, closing the pilot valve. Pressure thereupon builds up behind the piston and moves it until the valve is in position on its cooperating seat, closing the opening. Since this arrangement provides no positive mechanical pressure for moving the valve to closed position, it is particularly susceptible to the piston sticking in open position; and since it is of the type which moves at once to either fully open or fully closed position, considerable difficulty has heretofore been experienced in such a valve with hammer.

Our invention obviates these difficulties by providing a pair of annular sealing elements 30 and 31 of resilient material, as oiled leather; and so arranging them that they provide a very effective rubbing engagement with their cooperating surfaces, and a dash-pot action permitting the valve to open readily but restraining closing movement to such an extent as to prevent hammering.

Referring now more particularly to Figures 2 to 5, it will be seen that the seal element 30 is frictionally gripped between the metal ring 26 and a lower metal ring 32, these metal rings being spaced by the L-shaped annular member 33 providing the channel 25, and being locked in place between a shoulder on the tube 16 and a shoulder in the upper or cap part of the casing 10. It will be noted that the piston 17 does not even approach the inner surface of the tube 16, but is spaced therefrom considerably. The lower metal ring 32 provides the only metal surface tending to maintain the top of the piston in alignment; and as may be best seen from Figure 3, it is a fairly loose fit about the piston with a clearance preferably between ten and twenty thanusandths of an inch.

As may be best seen in Figure 5, the inner edge of the seal 30 is chamfered or cut at an angle. Moreover, in undistorted position, the inner diameter of the annular seal 30 is considerably less than the diameter of the piston. When the piston is moved up from the position shown in Figure 5 to the operative position shown in Figure 3 the seal 30 is, therefore, distorted. That is, as may be best seen in Figure 3, its edge is forced upwardly to engage the surface with which it makes rubbing contact at a considerable angle. The upper metal backing ring 26 has a larger internal diameter than the lower ring 32. Figure 3 is an enlarged scale embodiment of a preferred form of our invention; and as may be well seen in this figure, the metal ring 26 provides supporting backing for the seal element 30, without preventing its upward angular displacement at the inner edge.

As may be best seen in Figure 4, the lower seal element 31 has its outer edge chamfered, rather than its inner edge; and is adapted to make rubbing engagement with the inner surface of the tube 16. This seal is held in position between a metal ring 34, designed to make a loose fit with the inner surface of the tube 16, and a cup-like metal member 35 holding the gasket or valve member 18. In this seal 31 the outer diameter, the diameter of the tip of the chamfered edge, is greater than the inner diameter of the tube 16. Thus when the piston is forced up into operating position in the tube the outer end or edge of the seal 31 also assumes an inclined position, as shown in Figure 4.

Referring more particularly to Figure 1, the two seals 30 and 31 are spaced longitudinally of the piston 17; and the seal 30 is fixedly positioned in the casing, while the seal 31 is movable with the piston. An annular chamber 36 is thus provided which varies in volume upon movement of the piston. This chamber is sealed off by the elements 30 and 31, so that fluid can flow into or out of it, upon movement of the piston 17, only by passing between the seal elements 30 and 31 and the surfaces with which they make rubbing engagement. It will be noted that the inclined edges of the seal elements have their angles positioned in such a direction that upon opening movement of the valve fluid flows past them from the side making an acute angle with the cooperating surface; whereas upon closing movement of the valve, fluid flows from the side making an obtuse angle with the cooperating surface. That is, upon opening or upward movement of the piston shown in Figure 1, fluid flows from the chamber 36 up between the edge of the seal 30 and the surface of the piston, the pressure being lowest above the piston. On the other hand, when the piston is moving down to close the valve, fluid must flow down past the edge of the seal 30, and up past the edge of the seal 31. It is at once apparent that fluid moving into the acute angle between the lower edge of the seal 30 and the piston, for example, tends to move the seal away from its engagement with the surface, so that a relatively free fluid path is provided; whereas, fluid tending to flow from the side of the seal making an obtuse angle with the piston surface tends to force the edge of the oiled leather seal still tighter against the piston, so that fluid flow in this direction is much more difficult. There is thus little or no dash-pot action by the chamber 36 upon opening of the valve, a commercial valve constructed in accordance with this disclosure opening wide in less than a second; whereas the chamber 36 provides considerable dash-pot action or restraint upon closing movement of the piston, so that it takes four or five seconds to close the valve. This is slow enough to completely obviate any difficulty with hammer, even under operating pressures of 125 pounds per square inch.

Referring now more particularly to the modification of our invention shown in Figures 6, 7 and 8, the valve casing 40 has its inlet 41 separated from its outlet 42 by a partition 43 having a central opening 44 therethrough adapted to be closed by the valve member 45 carried by the piston 46. The piston is a fairly loose fit in a cylinder in a cap member 47 providing a closed chamber 48 behind, or below, the piston.

The piston is normally urged upwardly by a spring 49 which tends to move it to closed position. It is adapted to be moved, against the force of the spring, to any desired open position by fluid pressure developed in the chamber 50 and transmitted through the rod members 51 and 52. The fluid in the chamber 50 may be that delivered from the bulb of a fluid thermostat; and it is physically separated from any possible contact with the fluid passing through the valve by appropriate Sylphons 53 and 54.

The piston 47 has surrounding it, and in rubbing engagement with it, a seal in the form of an annulus 55. As may be best seen in Figure 7, a packing or supporting ring of metal 56 is provided, and the seal and ring are locked between a shoulder on the casing and the upper edge of the cap member 47.

Referring now more particularly to Figure 8, the annular seal is again here disclosed as being of resilient material, as oiled leather, having a chamfered edge; and as having an internal diameter less than the diameter of the piston 46, so that when it is in rubbing engagement with the surface of the piston it is distorted and at an angle thereto. As in the seal heretofore described, the angle of the chamfer is so chosen, in combination with the internal diameter, that the diameter of the piston is about intermediate the two diameters of the chamfered or angularly cut edge.

Again referring back more particularly to Figure 6, it will be seen that the fact that the edge is distorted upwardly makes it relatively easy for fluid in the chamber 48 to flow out past the seal during opening movement of the piston; but makes it fairly hard for fluid to flow past the seal into the chamber upon closing movement of the piston, so that there is considerable restraint imposed upon such movement.

In the form of valve shown in Figure 9 the main piston 60 is movable within a cylinder formed by the tube 61. It carries a valve member 62 adapted to close an opening 63 through the partition separating the valve inlet from the outlet. In this form of valve the pilot valve 64 is carried on a piston 65 normally urged upward by the spring 66. Between the piston 60 and the cylinder within which it moves lie the seal elements 67 and 68 similar respectively to the seals 31 and 30 described heretofore; and in rubbing engagement with the piston 65 is a seal 69 similar in construction and arrangement to the seal 55 heretofore described. A dash-pot restraining action of the auxiliary or pilot valve is provided by means of the chamber 70; and a dash-pot action restraining movement of the main piston and valve is provided by the annular chamber 71. This construction is particularly effective in insuring a very slow closing movement of the main valve, since the pilot valve as well as the main valve is restrained during such closing movement.

The relative dimensions of the resilient oiled leather seal elements may be seen in general from the drawings. As an example of preferred embodiments of our invention, the leather washer used on a main piston of a ¾ inch valve had an outer diameter of 1 13/16 inches; an inner diameter, at the apex of the chamfered edge, of 11/16 inch; and an inner diameter at the other end of the chamfered edge, of 13/16 inch. The inner diameter of the backing or retainer ring was 13/16 inch; and the washer was used with a piston having a diameter of .8095 inch. As an example of the seals used on a 1¼ inch valve of the type shown in Figure 9, the top main seal had an outer diameter of 2 1/16 inches; an inner chamfered edge diameter of 1⅛ inches; and a diameter at the apex of the chamfered edge of 1 13/16 inches. It will be noted that the chamfered edge of the seal is to the outside; and it cooperated with the inner wall of a cylinder having a diameter of about 2.005 inches. The bottom main piston seal had an outer diameter of 1⅞ inches; a diameter at the apex of the chamfered edge, to the inside this time, of 1¼ inches; and the other diameter of the chamfered edge was 1½ inches. This was used with a main piston having a diameter of 1.365 inches plus or minus .005 and a retainer ring of 1 1/16 inches. The seal on the pilot valve piston had an outer diameter of 13/16 inch; an inner diameter at the apex of the chamfered edge of ⅜ inch; and the other diameter of the chamfered edge was ⅝ inch. This was used with a piston having a diameter of .497 inch plus or minus .0005; and a retainer ring of ⅝ inch internal diameter. Despite the fact that they have a substantial thickness, the seals make rubbing engagement with their cooperating surfaces, because of the chamfer, through only a relatively small contact distance. While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. An automatic pilot-actuated floating piston valve of the character described for regulating fluid flow, including: a valve casing having an inlet and an outlet; a partition in the casing separating the inlet and outlet, the partition having an opening therein; a piston; a valve member carried by the piston adapted to close the opening; pilot means; means for moving the pilot to effect movement of the piston and member; and a pair of annular seals surrounding the piston and spaced longitudinally thereof, each seal being of resilient material disposed, at least as to the portion adjacent the surface with which it makes rubbing contact, at an angle to the surface, one of the seals being fixedly positioned and the other being movable with the piston and said angles being oppositely disposed, whereby the annular space between the seals provides a dash-pot action.

2. Apparatus of the character claimed in claim 1, wherein the angles of the seals are such that when the piston is moving in a direction corresponding to closing movement of the valve fluid flow between the space between the seals and the space beyond the seals is past each seal from the side disposed at the greater angle with the surface with which it makes rubbing engagement, whereby the dash-pot action considerably restrains closing movement of the valve member without substantially restraining opening movement thereof.

3. An automatic floating piston valve of the character described for regulating fluid flow, including: a valve casing having an inlet and an outlet; a partition in the casing separating the inlet and outlet, the partition having an opening therein; a piston; a valve member carried by the piston adapted to close the opening; pilot means; means for moving the pilot to effect movement of the piston and member; and a pair of annular seals surrounding the piston and spaced longitudinally thereof, one of the seals being fixedly positioned and the other being movable with the piston, the arrangement being such that flow of fluid to and from the space between the seals is more restricted in one direction than the other, whereby the annular space between the seals provides a dash-pot action.

HENRY L. BEEKLEY.
RICHARD H. GILBERT.
ROLLIN H. LACART.

CERTIFICATE OF CORRECTION.

Patent No. 2,285,323. June 2, 1942.

HENRY L. BEEKLEY, ET AL.

It is hereby certified that error appears in the printed specification of the above numbered patent requiring correction as follows: Page 1, second column, line 32, for the word "improving" read --imposing--; and that the said Letters Patent should be read with this correction therein that the same may conform to the record of the case in the Patent Office.

Signed and sealed this 21st day of July, A. D. 1942.

(Seal)

Henry Van Arsdale,
Acting Commissioner of Patents.